INVENTOR.
HARLEY H. REESE,
BY
Berman, Davidson  Berman
ATTORNEYS.

Sept. 17, 1968          H. H. REESE          3,401,788

MOTOR MOUNT AND DRIVE ASSEMBLY FOR UPRIGHT GRAIN AUGERS

Original Filed Aug. 13, 1965          3 Sheets-Sheet 2

INVENTOR.
HARLEY H. REESE,
BY
Berman, Davidson & Berman
ATTORNEYS.

Sept. 17, 1968      H. H. REESE      3,401,788
MOTOR MOUNT AND DRIVE ASSEMBLY FOR UPRIGHT GRAIN AUGERS
Original Filed Aug. 13, 1965      3 Sheets-Sheet 3
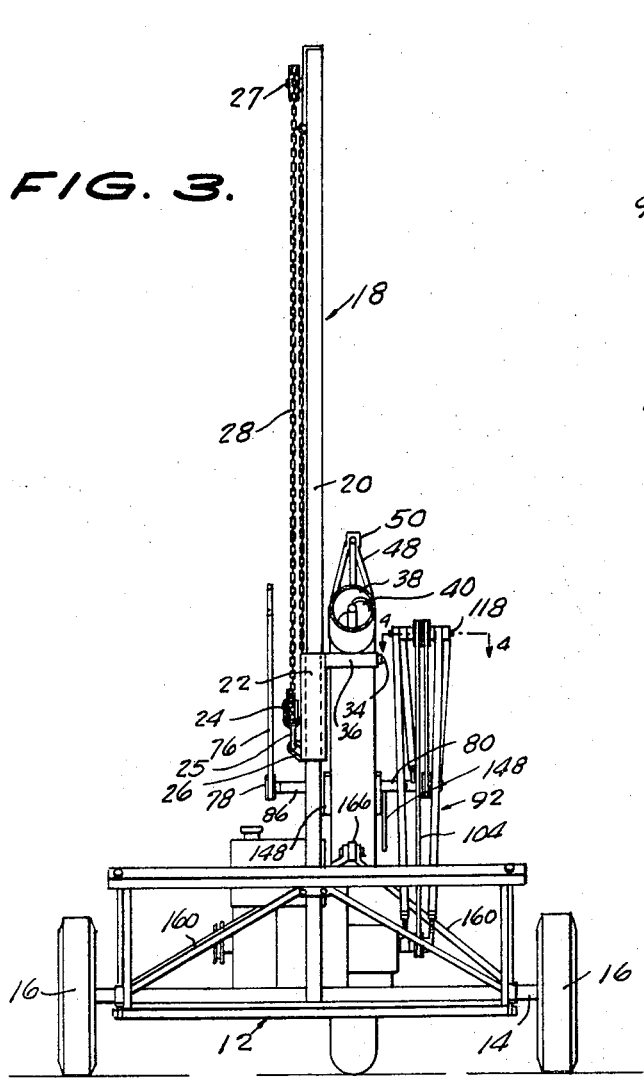
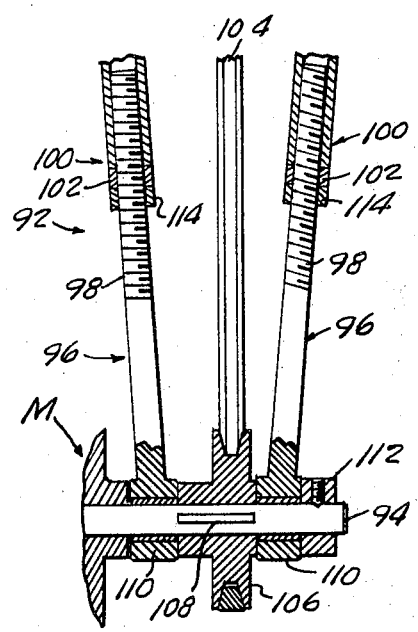
INVENTOR.
HARLEY H. REESE,
BY
Berman, Davidson & Berman
ATTORNEYS.

United States Patent Office 3,401,788
Patented Sept. 17, 1968

3,401,788
MOTOR MOUNT AND DRIVE ASSEMBLY FOR
UPRIGHT GRAIN AUGERS
Harley H. Reese, R.F.D., Logan, Kans. 67646
Continuation of abandoned application Ser. No. 479,455,
Aug. 13, 1965. This application Jan. 23, 1967, Ser. No.
621,383
4 Claims. (Cl. 198—121)

ABSTRACT OF THE DISCLOSURE

Means for driving an elongated, inclined conveyor of variable inclination from a fixed power source, said means comprising: a first pair of arms, a second pair of arms, the arms of one pair being joined to the arms of the other pair on a mutual pivot pin, said pulley forming a journal for a double pulley lying between mutually adjacent ends of both pairs of arms; the opposite ends of the arms of each pair converging to a common pivot pin and containing between them a single pulley keyed to said pin.

---

This invention relates to a motor mount and drive assembly for upright grain augers, and is a continuation of application Ser. No. 479,455, filed Aug. 13, 1965, now abandoned.

In prior arrangements of upright grain augers, the drive motors thereof have been mounted on the auger tubes, so that handling of the auger tubes, as in adjusting and/or transporting the same, have been onerous and difficult, due to the combined weight and bulk of the tubes and motors; and operation of the motors, including the starting and stopping thereof, with the tubes in elevated positions, and motor servicing, such as changes of oil, have required climbing up to the motors, in any suitable manner, to reach the motors.

The primary object of the present invention is the elimination of the above-outlined difficulties, and others, by the provision of a wheeled mount for grain auger tubes, which supports the auger drive motor in a readily accessible position, substantially at ground level.

In the drawings:

FIGURE 3 is a vertical transverse section, taken on the line 3—3 of FIGURE 1;

FIGURE 5 is an enlarged fragmentary, vertical transverse section, taken on the line 5—5 of FIGURE 1.

Figure 1:
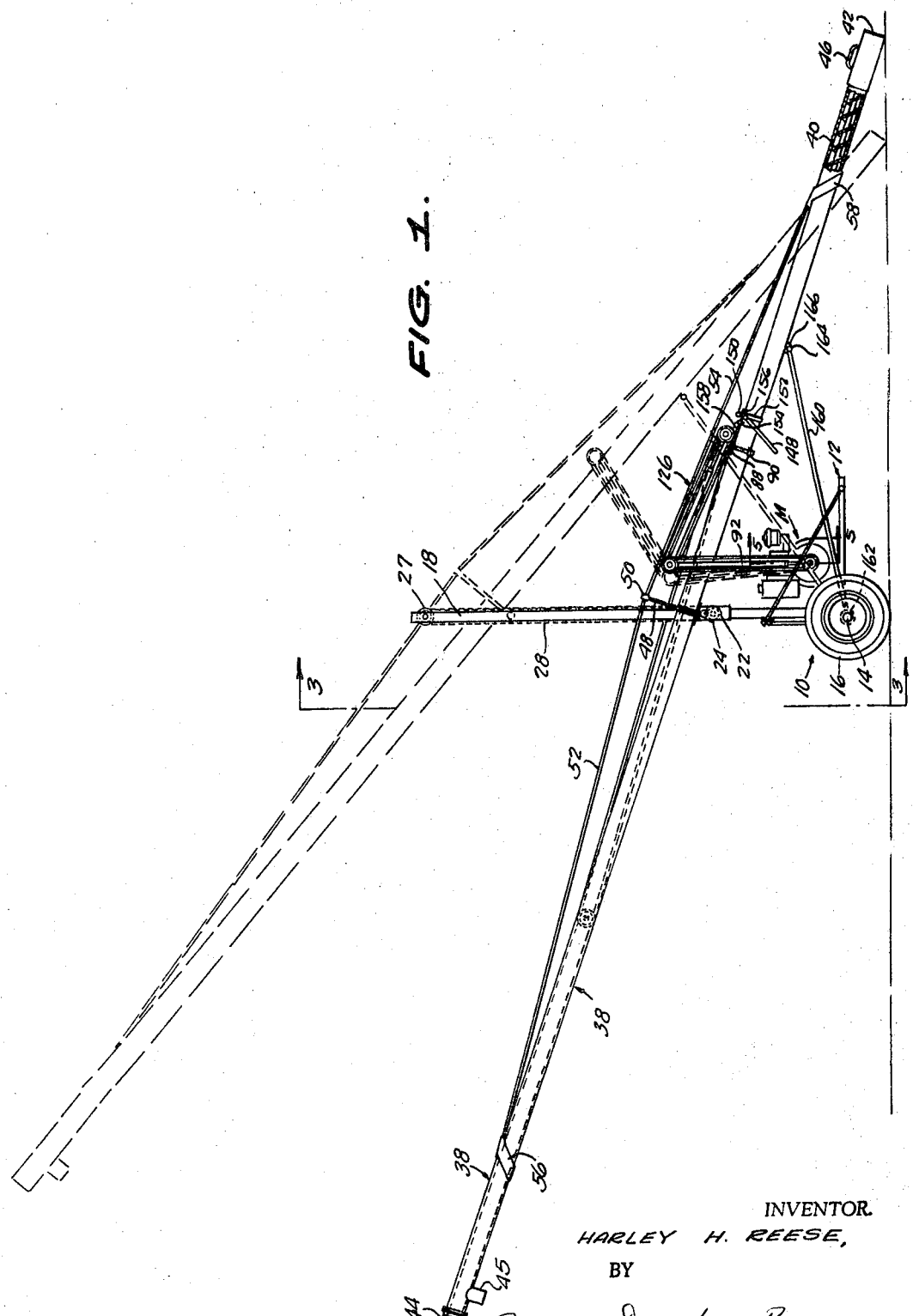
FIGURE 1 is a side elevation of a device of the invention, showing the auger tube in different adjusted positions, in full and in phantom lines.
Figure 2:
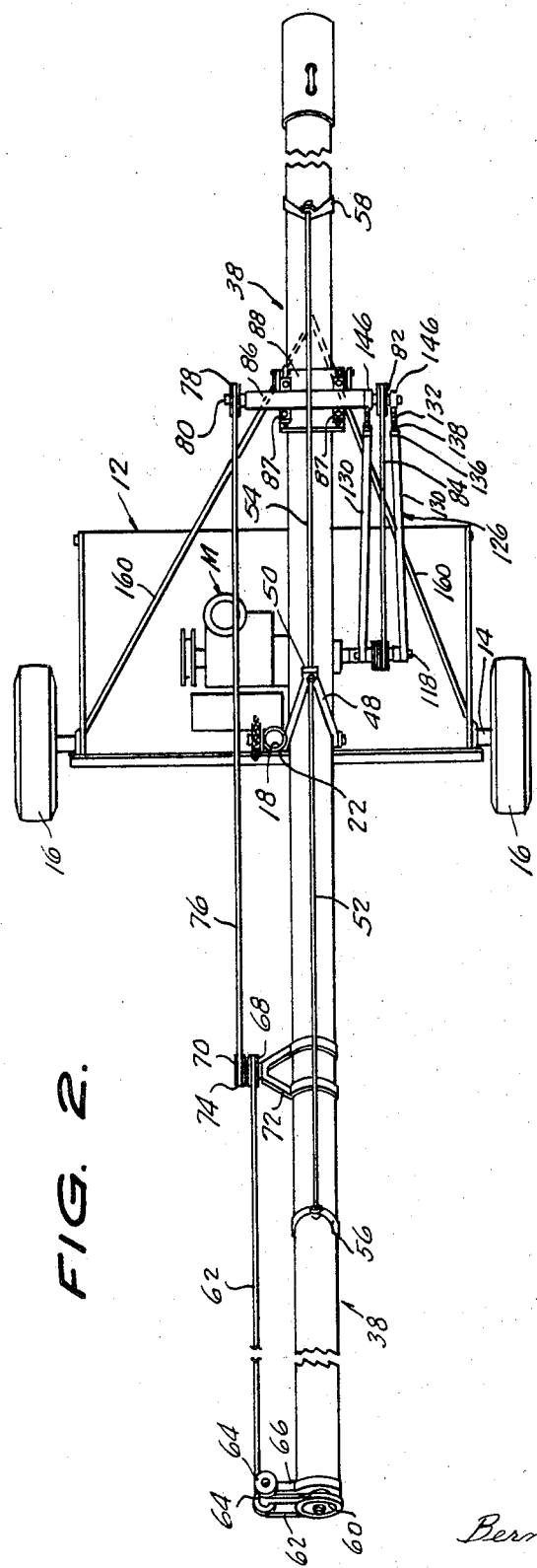
FIGURE 2 is a top plan view of the device.

Referring in detail to the drawings, the illustrated device comprises a base 10 comprising a flat horizontal transversely-elongated base plate 12, across whose forward end an axle 14 is suitably secured, having ground-engaging wheels 16 on its ends.

An auger tube mast 18 rises centraly from the forward end of the base plate 12, and is fixed thereto. The auger mast 18 comprises a fixed perpendicular standard 20 suitably affixed at its lower end on the base plate 12, and on the lower part of which is slidably circumposed a relatively short sleeve 22.

The sleeve 22 is adapted to be raised and lowered, by means of a block-and-tackle arrangement which comprises a lower pulley 24 secured by an eye 25 to an eye 26 on the lower part of the sleeve 22, an upper pulley 27 at the upper end of the standard 20, and a chain 28 trained around both pulleys. An end of the chain 28 is secured, as indicated at 29, to the lower pulley 24, and the other end of the chain 28 is selectively secured on a hook 30 adjacent to and below the upper pulley 27.

Fixed on the side of the sleeve 22 remote from the chain 28, is a lateral horizontal pivot shaft 34 which is journaled through a bearing sleeve 36 affixed to the underside of an elongated cylindrical auger tube 38 which extends forwardly and rearwardly beyond the base 10. A rotary auger conveyor 40 is contained in the tube 38 and is suitably confined therein, against longitudinal movement relative to the tube 38. The pivot shaft 34 and the bearing sleeve 36 provide for desired depression of the rear end 42 of the auger tube 38 for the intake of grain, or the like, adapted to be discharged from the elevated forward end 44 of the tube. A bail handle 48 is provided on the upper side of the tube 38 at the lower end thereof, and a discharge spout 45 is provided on the tube near the upper end thereof.

The auger tube 38 is longitudinally-braced by means of a pair of fixed right-angular, upwardly-extending and upwardly-converging brace bars 48 located at the pivot point of the tube, and joined together at their upper ends, as indicated at 50, at which point are secured the related ends of longitudinal brace rods 52 and 54. The brace rods 52, 54 angle toward the tube 38 and are secured at their other ends to the tube 38, as by means of upper and lower anchors 56, 58, which embrace and are fixed to the upper and lower rods, respectively, of the auger tube 38.

At its upper end the auger 40 is provided with a fixed drive pulley 60, around which is trained an upper drive belt 62 which has flights which are trained around spaced pulleys 64 carried by a lateral bracket 66 secured around the tube 38 and extending laterally therefrom at the same side of the tube 38 as the mast 18.

The upper drive belt 62 extends rearwardly along the tube 38 and is trained around an inner transfer pulley 68 which is fixed on a lateral rotary shaft 70, carried by a bracket 72, surrounding and fixed to the tube 38 at a mid-way point between the upper end of the tube 38 and its pivotal point. An outer transfer pulley 74 fixed on the shaft 70 has trained therearound a lower drive belt 76.

The lower drive belt 76 is trained, at its rear end, around a pulley 78, fixed on the adjacent end of a transverse transfer shaft 80 having a pulley 82 fixed on its other end. An intermediate drive belt 84 is trained around the pulley 82 and extends upwardly and forwardly therefrom a plane spaced above and parallel to the auger tube 38, as shown in FIGURE 1.

The transfer shaft 80 is journaled through a sleeve 86 fixed on bearings 87 slidably-mounted upon a plate 88 which extends across the top of and is fixed, as indicated at 90, upon the auger tube 38 at a location substantially mid-way between the pivot point of the tube 38 and the rear end 42 thereof.

A vertical forwardly and rearwardly-swingable strut 92 is journaled, at its lower end, on the horizontal transverse drive shaft 94 of a motor M mounted upon the base plate. As shown in FIGURE 5, the strut comprises a pair of laterally-spaced, upwardly-divergent belt-adjusting arms, each comprising a lower section 96 having a threaded upper portion 98 on which is slidably-engaged a tubular upper section 100. Adjusting nuts 102 threaded on the upper portions 98 of the lower sections 96 against the lower ends of the tubular upper sections 100 provide for elevating and depressing the upper sections for tightening and loosening, respectively, a vertical drive belt 104. The belt 104 is trained around a pulley 106 circumposed on and keyed, as indicated at 108, on the motor shaft 94, between bearings 110 on the lower ends of the lower sections 96, journaled on the shaft 94 between the pulley 106 and the motor M, and between the pulley 106 and a collar 112 secured on the outer end of the shaft. Lock nuts 114 are threaded on the lower arm sections 96 against the undersides of the adjusting nuts 102 for holding adjustments thereof.

Figure 4:
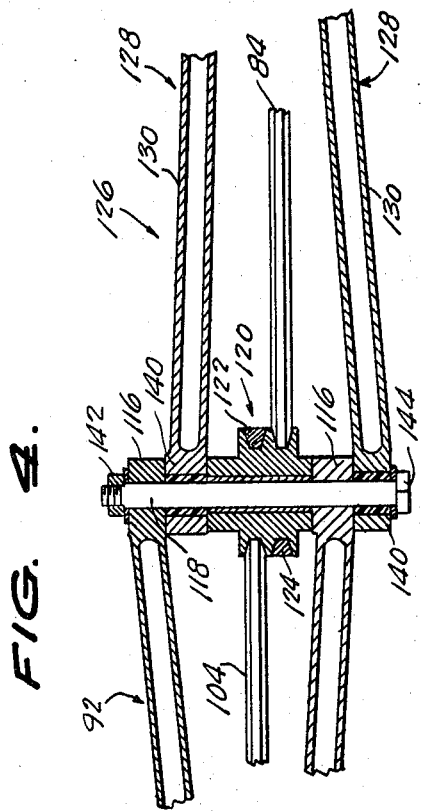
FIGURE 4 is an enlarged fragmentary horizontal section, taken on the line 4—4 of FIGURE 3.

As shown in FIGURE 4, the upper sections 100 of the related strut arms have bearings 116 journaled on a transverse horizontal shaft 118, on an intermediate portion of which is journaled a double pulley 120 having inner and outer grooves 122 and 124, respectively. The belt 104 is trained, at its upper end, around the inner groove 122.

A rearwardly-declining strut 126 comprises a pair of laterally-spaced belt-adjusting arms 128, each composed of a tubular forward section 130, and a rear section 132, having a threaded forward end portion inserted in the forward section, and equipped with adjusting nuts 136 and lock nuts 138 for adjusting the tension of the intermediate belt 84. The intermediate belt 84 is trained, at its forward end, around the outer groove 124 of the double pulley 120.

As shown in FIGURE 4, the tubular forward sections 130 of the arms 128 of the strut 126 have bearings 140 journaled on the shaft 118, between the inner arm of the strut 92 and the double pulley 120, and between the double pulley 120 and the outer arm of the strut 92, this assembly being secured in place on the shaft 118, as by means of a nut 142, on one end thereof, and a head 144 on the other end of the shaft.

At their ends, the rear sections 132 of the arms 128 of the strut 126 have bearings 146 which are journaled on the shaft 80 at opposite sides of the pulley 82.

Pendent hand levers 148 are pivoted, at their upper ends, as indicated at 150, on a bracket 152 fixed on the auger tube 38 behind the plate 88 and links 154 are pivoted, as indicated at 156, at their rear ends to the levers 148, and are pivoted at their forward ends, as indicated at 158, to the bearings 87. This arrangement of levers 148 provides for loosening and tightening the lower drive belts 76, the tightening of the belt 76 producing operative connection between the motor M and the auger 40.

A pair of rearwardly-divergent control rods 160 are journaled at their forward ends, as indicated at 162, on the base axle 14 and are pivoted, at their rear ends, as indicated at 164, to opposite sides of an ear 166 extending downwardly from the auger tube 38 at a location between the levers 148 and the rear end 42 of the tube 38.

As indicated in solid and in phantom lines in FIGURE 1, changes in the vertical position of the auger tube 38 relative to the base 10, and changes in angulation of the tube 38 relative to the horizontal are accompanied by changes in the angulations of the struts 92 and 126. Such changes in angulations of the struts relative to each other, and relative to the perpendicular and the horizontal do not, however, affect the existing adjusted tensions of the belts associated therewith. As the result of this, the undesirable vibrations and noise with accompanying rapid wear of pulleys and belts, which otherwise are attendant upon belt assemblies wherein the tensions of the belts are varied by changes in positions of the auger tube 38, are eliminated, and greater efficiency of operation is obtained along with a reduction of required motor output and fuel savings.

What is claimed is:

1. For use with an auger type conveyor having a wheeled carriage and means on said carriage for elevating a medial point of said conveyor, with said conveyor being tiltable relative to said elevating means, and said carriage having affixed thereto a power driven shaft, a device comprising: a first pair of arms; a second pair of arms, a mutual pivot pin joining said pairs of arms, said pin forming a journal for a double pulley lying between mutually adjacent ends of the arms of both pairs on the pivot pin, the opposite ends of the arms of each pair converging to a common pivot pin and containing between them a single pulley adapated to be keyed to said pin, and belt means connecting each of said single pulleys to a sheave of said double pulley.

2. A device as set forth in claim 1, in which the pivot pin at one of said single pulley ends is journaled in a bracket adapted to be attached to said auger, with said pin extending across said auger and having a pulley secured to its end opposite said arms.

3. A device as set forth in claim 1, in which each of the arms of each pair contains means for adjusting the length of such arm.

4. A device as set forth in claim 3, in which the pivot pin at one of said single pulley ends is journaled in a bracket adapted to be attached to said auger, with said pin extending across said auger and having a pulley secured to its end opposite said arms.

References Cited

FOREIGN PATENTS 132,532   3/1933   Austria.

EDWARD A. SROKA, *Primary Examiner.*